United States Patent [19]

Wainfan

[11] Patent Number: 4,867,396
[45] Date of Patent: Sep. 19, 1989

[54] MICRO FLAP TRAILING EDGE DEVICE FOR AN AIRCRAFT WING

[75] Inventor: Barnaby S. Wainfan, Lakewood, Calif.

[73] Assignee: Lockheed Corporation, Calabases, Calif.

[21] Appl. No.: 641,430

[22] Filed: Aug. 17, 1984

Related U.S. Application Data

[63] Continuation of Ser. No. 495,894, May 18, 1983, abandoned.

[51] Int. Cl.$^4$ .............................................. B64C 23/00
[52] U.S. Cl. ...................................... 244/215; 244/198
[58] Field of Search .......................................... 244/198

[56] References Cited

U.S. PATENT DOCUMENTS

| | | | |
|---|---|---|---|
| 1,893,064 | 1/1933 | Zaparka | 244/198 |
| 4,314,795 | 2/1982 | Dadone | 244/35 R |

FOREIGN PATENT DOCUMENTS

| | | | |
|---|---|---|---|
| 921144 | 4/1947 | France | 244/35 R |
| 329400 | 9/1935 | Italy | 244/213 |

Primary Examiner—Galen Barefoot
Assistant Examiner—Rodney Corl
Attorney, Agent, or Firm—Louis L. Dachs

[57] ABSTRACT

The invention is a small flap like device (18) for attachment to the trailing edge (14) of an aircraft wing (10) which improves the coefficient of lift and reduces the coefficient of drag providing an overall increase in fuel economy. The flap (18) is a flat plate-like member having a length (19) of between 0.5% to 1.5% of the chord of the airfoil and at a downward angle (21) to the chord of between 5° and 25°.

4 Claims, 4 Drawing Sheets

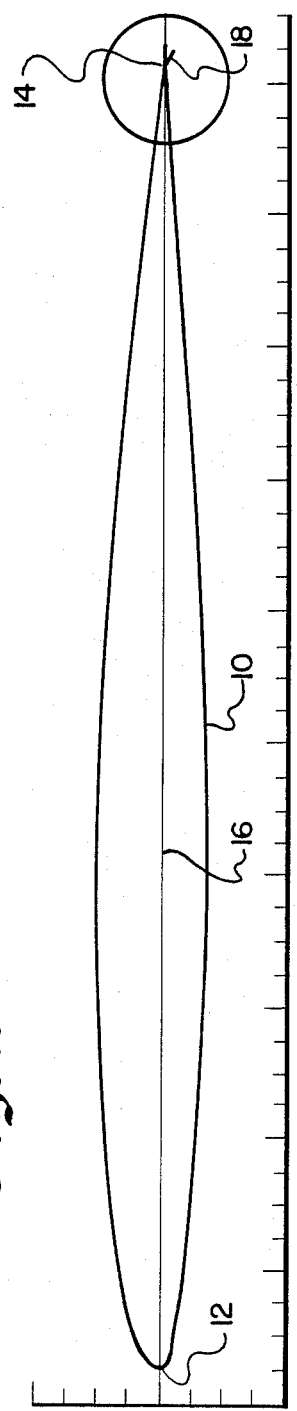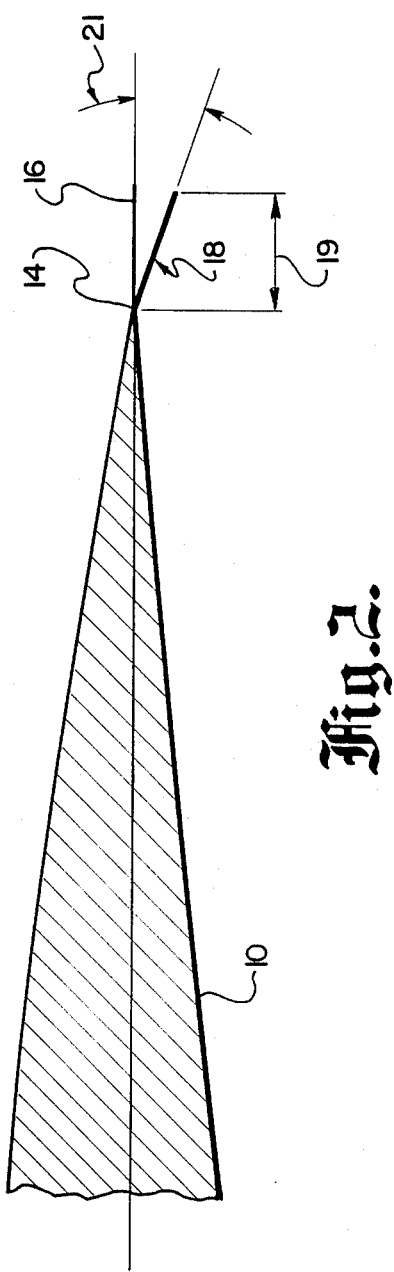

MICRO FLAP TRAILING EDGE DEVICE FOR AN AIRCRAFT WING

This is a continuation of co-pending application Ser. No. 495,894 filed on May 18, 1983, abandoned.

TECHNICAL FIELD

The invention relates to the field of conventional transonic airfoils for aircraft and more particularly to a trailing edge flap device that increases the coefficient of lift, decreases the coefficient of drag, and with the combined effect of reducing fuel consumption.

BACKGROUND ART

Most modern transonic transport aircraft such as Lockheed Corporation's L-1011 transport cruise at Mach numbers between approximately 0.8 and 0.87. Further increases in speed tend to cause strong shock waves on or about the airfoil (wing) which cause a marked increase in drag. At lower Mach numbers the value of the coefficient of drag is comprised mostly of induced and skin friction phenomena. The coefficient of drag increases dramatically with increasing Mach number due to wave drag and peaks at a Mach number of 1 or thereabouts. Thus, modern aircraft flying in this high subsonic or transonic range have airfoils designed to delay the onslaught of this wave drag above a cruise Mach number determined from initial and operating cost considerations.

This has classically been accomplished by designing the airfoil with a sophisticated curvature. For example, U.S. Pat. No. 3,952,971 "Air Foil Shaped For Flight at Subsonic Speeds," by R. T. Whitcomb, uses an upper surface contoured to control flow accelerations and pressure distributions over the upper surface to prevent shock formulation at the high speeds on the airfoil surface (well above the critical Mach number). A higher cambered trailing edge section is provided which improves overall airfoil lifting efficiency. Unfortunately, the shape of this particular wing presents structural problems, particularly in the area of incorporating trailing edge flaps. Thus, the airfoils for this type of aircraft have been basically a compromise between aerodynamic efficiency and structural integrity.

Prior to the instant invention, the incorporation of flaps of any sort at the trailing edge was primarily for increasing the maximum lift for takeoff and landing purposes. The flaps typically are extended outward or downward and most often both to increase the camber and the area of the airfoil. But such flaps were not used at cruise conditions for transport aircraft because of the overall increase in drag. There have, however, been successful attempts to increase the lift and reduce the drag of airfoils used on racing cars by incorporation of a trailing edge flap. On racing cars an inverted airfoil is often used to create down force to better hold the car on the ground. It was discovered that a small flap projecting vertically upward-normal to the chord at the trailing edge of the airfoil would increase down force by significant amounts with some reduction in drag at high lift coefficients.

While this type of flap has been found to be acceptable for use on racing cars travelling at around 200 miles per hour, where maximum down force is the objective it has proven unacceptable for use on aircraft flying at high subsonic Mach numbers such as modern commercial aircraft. This automobile flap is discussed in detail in the AIAA Journal Of Aircraft, Paper No. 80-3034, entitled "Design of Air-Foils for High Lift" by Robert H. Liebeck. Another approach to the problem has been the incorporation of wedge shaped members at or near the trailing edge.

Thus, it is a primary object of the subject invention to provide an airfoil design for an aircraft that substantially increases the coefficient of lift and reduces the coefficient of drag at cruise, thus providing an overall increase in fuel efficiency.

It is another object of the subject invention to provide a simple device for improving the performance of an airfoil without undue detrimental changes to the overall performance of the aircraft.

A still further object of the subject invention is to provide a device for improving performance of an airfoil for an aircraft which can easily be attached without undue structural changes.

DISCLOSURE OF THE INVENTION

The invention is a small flap-like device for attachment to the trailing edge of an aircraft airfoil which improves the coefficient of lift and reduces the coefficient of drag providing an overall increase in fuel economy at cruise. The flap is a flat plate-like member placed at the trailing edge of the airfoil having a length of between 0.5% to 1.50% of the chord of the airfoil and positioned at a downward angle to the chord of between 5° and 25°.

Preferably, the length of the flap is approximately 1% of the chord of the airfoil and the preferred angle to the chord of the airfoil is 20°. Furthermore, the flap should be as thin as possible taking into account structural considerations.

The novel features which are believed to be characteristic of the invention, both as to its organization and its method of operation, together with further objects and advantages thereof, will be better understood from the following description in connection with the accompanying drawings in which a presently preferred embodiment is illustrated by way of example. It is to be expressly understood, however, that the drawings are for purposes of illustration and description only, and are not intended as a definition of the limits of the invention.

BRIEF DESCRIPTION OF THE DRAWINGS

Illustrated in FIG. 1 is a cross-sectional view of an airfoil with the micro flap attached.

Illustrated in FIG. 2 is an enlarged view of the trailing edge portion of the airfoil shown in FIG. 1.

Figure 3:
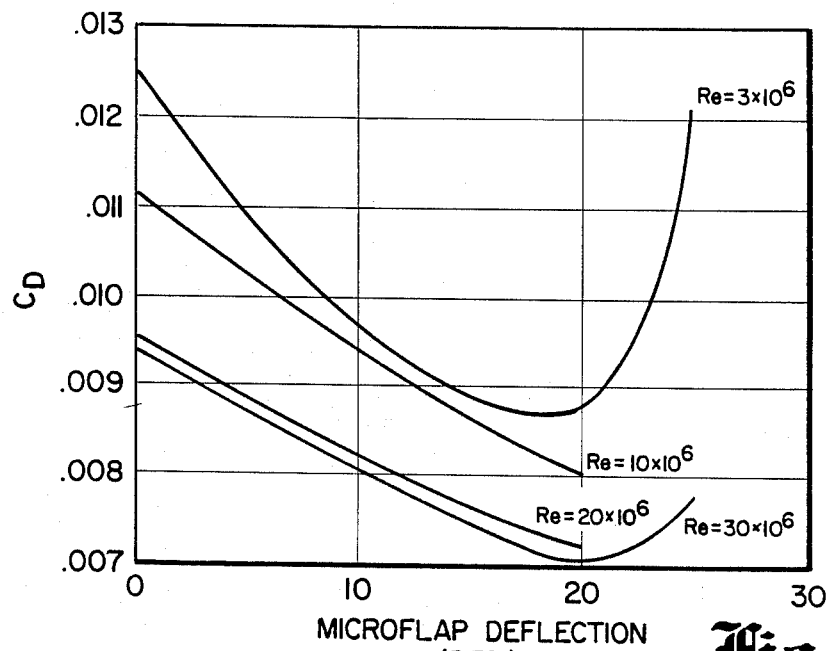

Illustrated in FIG. 3 is a graph presenting the calculated coefficient of drag as a function of the micro flap deflection.

Figure 4:
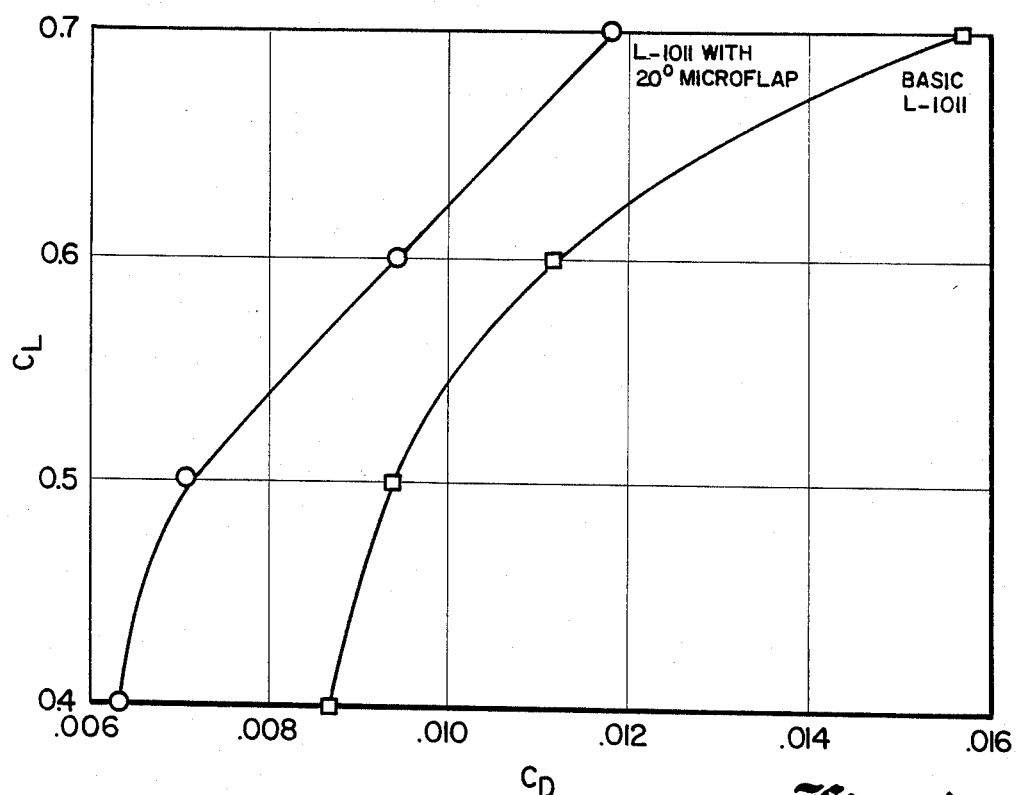

Illustrated in FIG. 4 is a graph of the calculated coefficient of lift ($C_L$) versus the coefficient of drag ($C_D$) for the basic L-1011 midspan airfoil and the L-1011 airfoil with a flap installed at a 20° downward to the chord.

Figure 5:
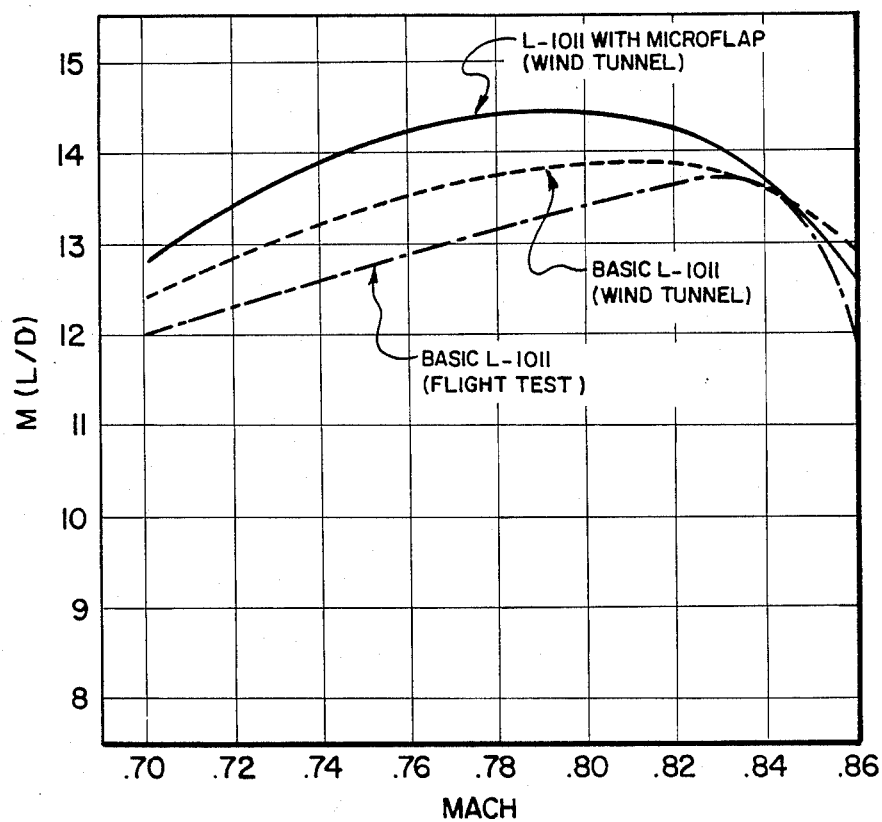
Figure 6:
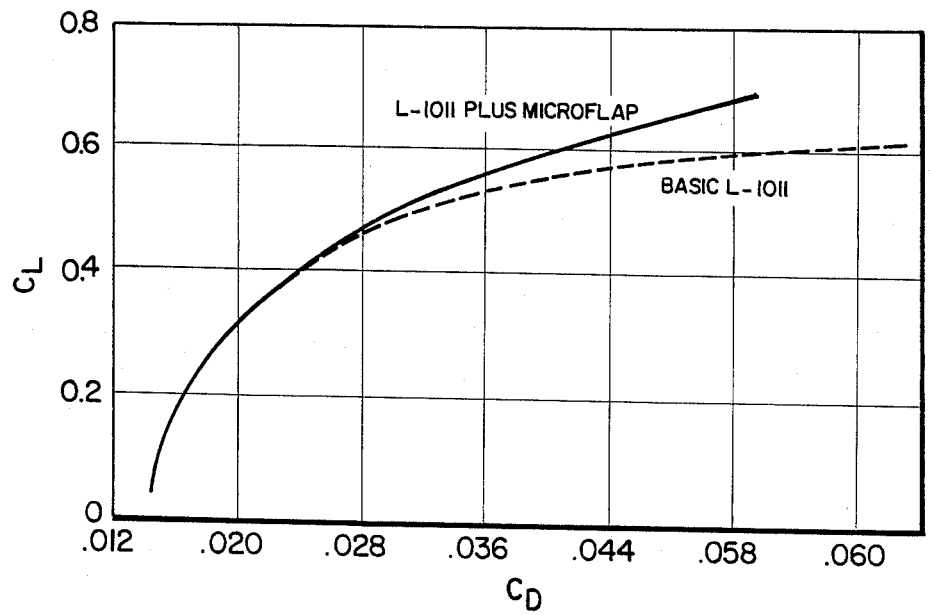

Illustrated in FIG. 5 is a graph of range factor versus Mach number for the basic L-1011 airfoil and L-1011 airfoil with flap installed devised from wind tunnel test Illustrated in FIG. 6 is a graph of the coefficient of lift ($C_L$) versus the coefficient of drag ($C_D$) of actual wind tunnel test data of the L-1011 wing with and without the flap installed at a Mach number of 0.85 and a Reynolds number of $3.0 \times 10^6$.

Figure 7:
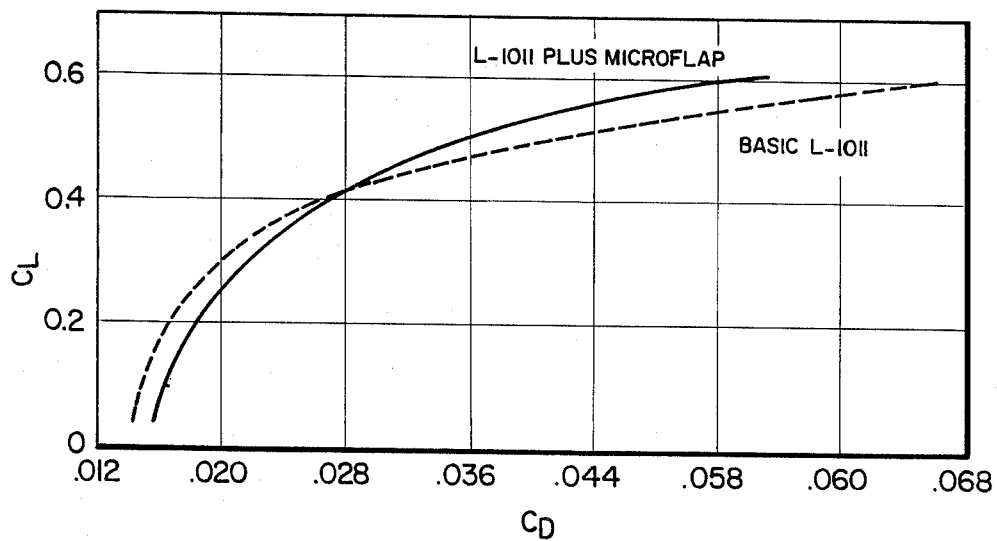

Illustrated in FIG. 7 is a graph of the coefficient of lift ($C_L$) versus the coefficient of drag ($C_D$) of actual wind tunnel test data of the L-1011 wing with and without the flap installed at a Mach num of 0.86 and a Reynolds number of $3.0 \times 10^6$.

BEST MODE FOR CARRYING OUT THE INVENTION

Illustrated in FIG. 1 is a cross-sectional view of a typical transport airfoil design. Particularly, it is the airfoil of Lockheed Corporation's L-1011 *airplane. FIG. 2 is an enlarged view of the trailing edge of the airfoil shown in FIG. 1. Referring to FIGS. 1 and 2 it can be seen that the airfoil, generally designated by numeral 10, has a leading edge 12 and a trailing edge 14 which define the chord 16 of the airfoil. The improvement to the airfoil comprises installing a flap 1B to the trailing edge 14 of the airfoil. The flap (hereafter called a micro flap) has a chord wise length 19 which may be varied from 0.5% to 1.5% of the chord 16 but preferably is 1%. The downward angle 21 that the micro flap 16 makes with the chord 16 can Vary anywhere from 5° to 25° but a minimum coefficient of drag ($C_D$) occurs at the preferred angle of 20°.

This is clearly illustrated in FIG. 3 which is a graph of the coefficient of drag ($C_D$) versus micro flap deflection angle 20°. The theoretical calculations which produced this graph used several Reynolds numbers and a Mach number of 0.76 and a coefficient of lift equal to 0.5. The 0.5 value of the coefficient of lift is a typical cruise coefficient of lift.

*L-1011 is a trademark of Lockheed Corporation.

Illustrated in FIG. 4 is a plot of the coefficient of lift ($C_L$) versus the coefficient of drag ($C_D$) for the L-1011 wing with a micro flap set at 20° to the chord versus the basic L-1011 airfoil without the micro flap. Here it can be seen that these theoretical calculations show a significant improvement in the coefficient of lift ($C_L$) for a given coefficient of drag ($C_D$). Note, also, that this favorable ratio is obtained over a large range of coefficients of lift.

It is known from classical aerodynamic theory that the lift of an airfoil is strongly influenced by the location of the point where the flow separates from the airfoil (usually the trailing edge) and by the direction of the flow streamlines at the separation point. In the case of the microflap, it appears that the flow would be deflected downwards at the trailing edge more so than it would be for the case without the microflap. The flow probably separates at the trailing edge 14 on the upper surface. This separation may induce some drag increase, but because of the short extent of the microflap (0.5 to 1.5% of chord) and its relatively modest inclination (about 20°), this drag increase is more than offset by the increase in lift, thus resulting in a net benefit in the lift-to-drag ratio of the airfoil.

In most cases where there is an improvement in one or more areas, some corresponding decrease in performance is found in another. Theoretical calculations have predicted two-dimensional pressure distributions for the L-1011 with a micro flap and showed a small negative pitching moment increment. This pitching movement increase was borne out in subsequent wind tunnel tests. This pitching moment increment is sufficiently small so that the increase in trim drag it induces does not significantly offset the decrease in airfoil drag offered by the micro flap modification.

Illustrated in FIG. 5 is a graph of range factor (Mach number X lift/drag) versus Mach number. The range factor is the most significant figure of merit for assessing the aerodynamic goodness of any airfoil designed for cruise efficiency. The importance of the range factor is demonstrated by the specific air range (miles flown per pound of fuel consumed) formula.

$$SAR = \left[\frac{a}{SFC}\right] \times M\frac{L}{D} \times \frac{1}{W_G}$$

SFC = specific fuel consumption
a = speed of sound
M L/D = range factor
$W_G$ = gross weight
SAR = specific air range This formula also points out the impact of gross weight ($W_G$) and of propulsion specific fuel consumption divided by the speed of sound. Consequently, in assessing aerodynamic technology for cruise efficiency, its effects on range factor, structural weight and air frame/propulsion integration must be evaluated. The specific air range formula clearly explains the importance of transonic flow for subsonic cruise aircraft; the lift to drag ratio (L/D) of a given aerodynamic configuration does not change substantially with Mach number until the drag rise due to transonic flow sets in. It is therefore, at this condition that the configuration will achieve its maximum range factor value.

Referring now to FIG. 5, it can be seen that the range factor for the basic L-1011 in flight test correlates very well with wind tunnel tests. The solid line representing the L-1011 with micro flap in the wind tunnel indicates that flight test of the aircraft would achieve a superior performance.

Illustrated in FIG. 6 is a graph of wind tunnel test results on the L-1011 airfoil with the micro flap installed and the micro flap removed. The plots record coefficient of lift ($C_L$) versus the coefficient of drag ($C_D$) at a Mach number of 0.83 and a Reynolds number of $3.0 \times 10^6$, at an altitude of 35,000 feet.

Illustrated in FIG. 7 is a similar graph but the data was recorded at a Mach number of 0.86. FIGS. 6 and 7 are included to show examples of numerous test results that clearly illustrate the advantages of the subject micro flap when installed on the L-1011 airfoil. Particularly note the increase in performance at 0.5 ($C_L$) which is a typical valve at a cruise Mach Number. It is again reiterated that the L-1011 airfoil is quite similar to those used on such aircraft as the 747 produced by Boeing Aircraft Corporation and the DC-10 produced by the McDonnell-Douglas Corporation, and in fact most aircraft operating in the high subsonic/transonic range could make use of this micro flap to increase performance.

Finally, while the micro flap has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The subject invention has application on all subsonic aircraft and particularly those which fly at Mach numbers in the high subsonic and transonic range.

What is claimed is:

1. An improvement for a high subsonic or transonic airfoil for an aircraft or the like, said airfoil having a chord length defined by the leading and trailing edge of the airfoil, the improvement comprising:

a flap member mounted to the trailing edge having a length of between 0.5% to 1.5% of the chord of the airfoil; and positioned at an angle of between 5° and 25° downward from the plane of the chord.

2. The improvement for an airfoil as set forth in claim 1 wherein the length of said flap is substantially 1% of said chord of said airfoil.

3. The improvement as set forth in claim 2 wherein said angle of said flap member to said chord is substantially 20°.

4. The improvement for an airfoil as set forth in claim 3 wherein the thickness of said flap member is as thin as structural considerations allow.

* * * * *